United States Patent
Baumgartner et al.

(10) Patent No.: US 7,866,447 B2
(45) Date of Patent: Jan. 11, 2011

(54) DISK BRAKE, ESPECIALLY WITH AN ELECTROMOTIVE ADJUSTING DEVICE, AND METHOD FOR CONTROLLING SAID TYPE OF DISK BRAKE

(75) Inventors: Johann Baumgartner, Moosburg (DE); Markus Stoehr, Munich (DE); Andreas Leinung, Munich (DE); Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/448,808

(22) Filed: Jun. 8, 2006

(65) Prior Publication Data

US 2007/0062767 A1 Mar. 22, 2007

Related U.S. Application Data

(63) Continuation of application No. PCT/EP2004/014010, filed on Dec. 9, 2004.

(30) Foreign Application Priority Data

Dec. 9, 2003 (DE) ................. 103 57 374

(51) Int. Cl.
*F16D 55/00* (2006.01)
*B60T 1/06* (2006.01)

(52) U.S. Cl. ............. 188/71.1; 188/18 A; 188/218 XL; 188/71.7; 188/71.8

(58) Field of Classification Search ................ 188/71.1, 188/18 A, 218 XL, 71.7, 71.8
See application file for complete search history.

(56) References Cited

U.S. PATENT DOCUMENTS 2,531,341 A * 11/1950 Meador, Jr. ................. 188/71.8
2,657,772 A * 11/1953 Chamberlain ............... 188/370
3,702,125 A * 11/1972 Jeffries ...................... 188/71.8
3,735,843 A * 5/1973 Wiig ......................... 188/72.1

(Continued)

FOREIGN PATENT DOCUMENTS

DE 29 19 128 A1 11/1979

(Continued)

OTHER PUBLICATIONS

PCT/IB/326, PCT/IB/338, PCT/IB/373 and PCT/ISA/237 with English translation thereof (Sixteen (16) pages).

(Continued)

*Primary Examiner*—Bradley T King
*Assistant Examiner*—Mahbubur Rashid
(74) *Attorney, Agent, or Firm*—Crowell & Moring LLP

(57) ABSTRACT

An electro mechanical or pneumatically actuated disk brake, in particular for a utility vehicle, includes a brake caliper or saddle and a brake disk. The brake saddle overlaps the brake disk at least in sections of the outer periphery thereof. The disk brake also includes a tensioning device which is entirely or partially inserted into the brake saddle. The tensioning device is used to produce a tensioning movement between the brake linings and the brake disk. The disk brake further includes at least one and preferably several adjusting devices. The brake disk and/or the brake saddle are arranged on a step with elastic pre-tension when the brake is in the release state.

4 Claims, 3 Drawing Sheets

U.S. PATENT DOCUMENTS

| | | | |
|---|---|---|---|
| 3,771,625 A | 11/1973 | Martins | |
| 3,831,719 A * | 8/1974 | Martins | 188/196 F |
| 6,012,556 A | 1/2000 | Blosch et al. | |
| 6,336,531 B1 * | 1/2002 | Chou | 188/218 XL |
| 7,032,721 B2 | 4/2006 | Baumgartner | |
| 2003/0006104 A1 | 1/2003 | Baumgartner et al. | |
| 2003/0127290 A1 * | 7/2003 | Severinsson et al. | 188/73.32 |
| 2004/0188189 A1 * | 9/2004 | Baumgartner | 188/71.7 |

FOREIGN PATENT DOCUMENTS

| | | |
|---|---|---|
| DE | 196 54 729 A1 | 7/1999 |
| DE | 101 39 911 A1 | 9/2002 |
| DE | 101 43 817 A1 | 3/2003 |
| DE | 101 56 503 A1 | 6/2003 |
| GB | 1 293 728 | 10/1972 |
| GB | 2 021 218 A | 11/1979 |
| WO | WO 02/14708 A2 | 2/2002 |

OTHER PUBLICATIONS

International Search Report dated Feb. 22, 2005 (Four (4) pages).

* cited by examiner

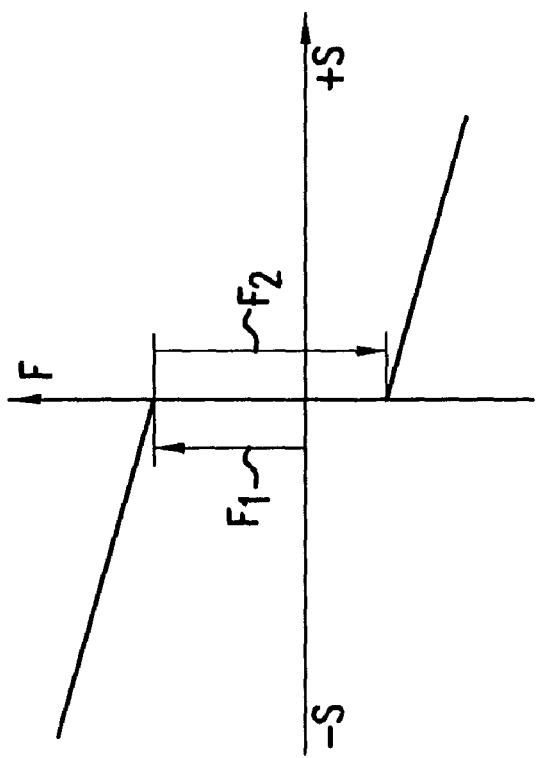
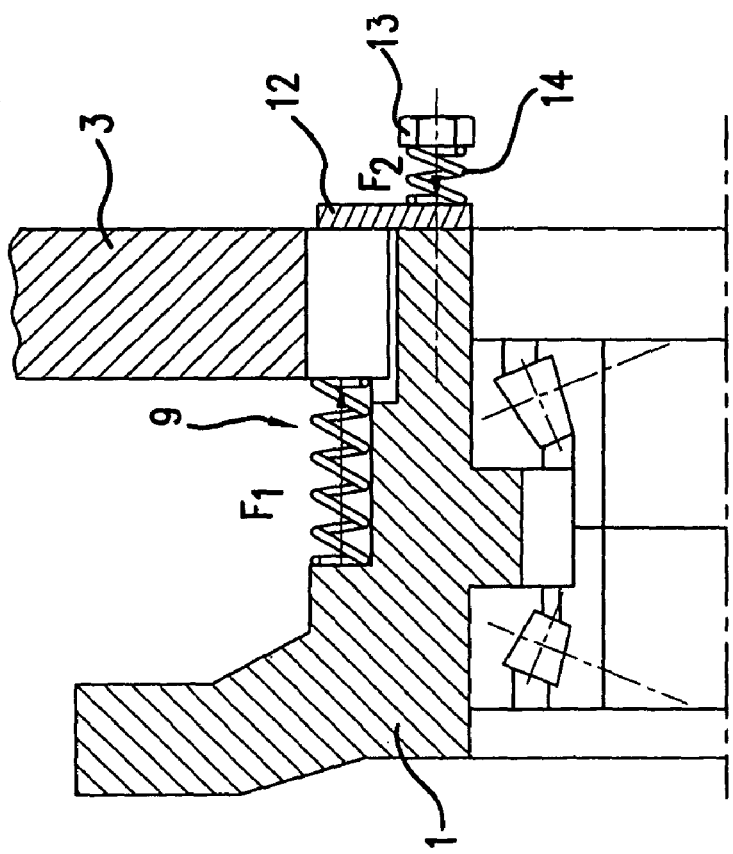
FIG.3b
FIG.3a

DISK BRAKE, ESPECIALLY WITH AN ELECTROMOTIVE ADJUSTING DEVICE, AND METHOD FOR CONTROLLING SAID TYPE OF DISK BRAKE

This application is a continuation of international application no. PCT/EP2004/014010, filed Dec. 9, 2004, the entire disclosure of which is incorporated herein by reference.

This application also claims the priority of German application 103 57 374.7, filed Dec. 9, 2003.

BACKGROUND AND SUMMARY OF THE INVENTION

The present invention relates to an electromechanically or pneumatically actuated disk brake including a brake caliper and a brake disk engageable over by the brake caliper at least in sections at its outer circumference, and in which the brake disk and the brake caliper are moveable relative to one another so that at least one of the brake disk and the brake caliper is moveable on a vehicle-mounted component. The disk brake further includes an application device at least partially inserted into the brake caliper to provide an application movement between brake linings and the brake disk, and at least one adjusting device for setting air play between the brake shoes and the brake disk. The invention additionally relates to a method for controlling a disk brake of this type.

In known, preferably pressurized-air-actuated disk brakes, a braking operation is carried out by actuating the application device, for example by movement of a piston rod of a pneumatic brake cylinder, by means of which piston rod a connected brake lining is pressed against the brake disk. Depending on whether the disk brake is embodied as a fixed-caliper brake or as a sliding-caliper or pivoting-caliper brake (or as a combination of these brake types), the brake disk is pushed against the further brake lining on the other side of the brake disk and/or the further brake lining is pushed against the brake disk.

In a fixed-caliper brake such as that of international publication WO 02/14708, the brake disk which is mounted such that it is axially moveable yet transmits torque to a wheel hub or to another component is pressed, by means of axial displacement and while overcoming air play, against the further brake lining which is preferably fixed relative to the fixed caliper.

After the end of the braking operation, there is often no defined release, at least at the side facing away from the application device, of the brake lining from the brake disk friction face. Instead, the brake linings remain adhered to the brake disk with a residual pressure force on account of the frictional forces which occur as a result of a lining bracket and possibly the sliding resistance of the brake caliper. The contact between the brake disk and the brake lining is normally released as a result of the vibration which normally occurs during driving, or as a result of so-called tumbling of the brake disk, which is in itself undesired.

The further contact between the brake linings and the brake disk after the application device is released results in additional wear both of the brake disk and of the brake linings, resulting in a reduced service life of the consumable parts with the corresponding cost disadvantages with regard to the purchase of replacement parts and assembly and/or disassembly.

The brake temperatures may also be somewhat increased as a result of a relatively long period of contact of the brake linings on the brake disk, which can likewise adversely affect the service life. Moreover, the increased driving resistance which occurs on account of the friction of the corresponding components in the non-braked position leads to a certain additional consumption of fuel, which is to be avoided.

In addition to the lack of forced ventilation, that is to say reliable release of the brake linings from the brake disk after the end of the braking operation, a further structural problem of fixed-caliper brakes is that the micromobility of the brake disk and/or of the brake caliper, as is required for operational reasons, leads to significant wear of the positive-fitting elements, particularly during extreme vibrational loading, as occurs when driving on poor-quality roads. The positive-fitting elements include in particular a splined gearing, by means of which the axially displaceable brake disk is held in a rotationally secured manner on an axle flange or a comparable vehicle-mounted component.

The extreme loading of the positive-fitting parts which occurs requires the corresponding components to be exchanged ahead of schedule, with the resulting costs, on account of wear.

One object of the present invention is therefore the object of further developing a disk brake of the type mentioned so that, in a structurally simple way, the wear of the brake disk and of the brake shoes is minimized, operational reliability is improved, and the service life is increased overall.

This object is achieved by providing a stop against which the brake disk and/or the brake caliper bear under elastic preload when the brakes are not applied. This ensures, in a structurally simple manner, that when the application device is released, that is to say at the end of the braking operation, free play is compulsorily generated between the brake shoes or their brake linings and the brake disk by the elastic force, so that the components are only in contact during a braking operation and are released from one another again thereafter. Here, the free play corresponds to the air play, that is to say the distance between the brake disk and the brake shoe, which is determined by the adjusting device.

The elastic preload forces are preferably dimensioned such that they are directly overcome by the application forces when the disk brake is applied—that is to say during a movement of the brake disk and/or of the brake caliper, and such that during air play setting operations and/or during driving in the period between braking operations and/or air play operations, the moveable brake disk and/or the moveable brake caliper are held in a position which is sufficiently fixed relative to the vehicle-mounted component, so that the brake linings do not begin to slip.

In this way, braking operations are not impeded and yet the slip effects which occur during driving, with the result of increased wear and fuel consumption, are minimized and the possibility of "intelligent" adjustment of the air play, including an "intelligent" air play function, is optimized. As a result of the possibility of minimizing fuel consumption, said disk brake will inevitably be the brake of choice in the future, in particular in the additionally space-saving arrangement as a fixed-caliper brake with an intelligent open-loop and closed-loop adjustment function—here, electrically driven and electronic—for example by means of a control unit which is integrated into the brake or by means of a "set-up" EBS control unit.

The elastic preload of the moveable element—brake caliper and/or brake disk—against the stop on the vehicle-mounted component is particularly advantageous if the adjusting devices have electromechanical drives and can be controlled by means of an electronic circuit. Here, even at least one or a plurality of adjusting devices are preferably arranged on each side of the brake disk, so that the mobility of the brake disk can be restricted to a "micro-displacement path"—the distance to be covered when the brakes are applied.

According to one variant, the brake caliper is embodied, in particular as a fixed caliper, such that it is immobile relative to a vehicle-mounted component such as an axle flange or the like. This is structurally simple particularly if the brake disk is mounted in an axially displaceable but non-rotatable manner on the vehicle-mounted component.

It is structurally advantageous if the stop is formed on the vehicle-mounted component and the elastic preload is provided by means of pressure elements which likewise rest on the vehicle-mounted component. Here, each pressure element can consist of a contact piece, which bears against the brake disk, and a pressure spring.

According to one advantageous refinement of the invention, the brake disk, which is mounted such that it is axially displaceable, can be pressed against the stop by the elastically held pressure element.

The spring forces are preferably applied by steel springs, or by a comparable spring material, which lie in a corresponding recess of the brake caliper, in the axle flange or the like, and on which the respective pressure element rests.

Here, the spring forces are to be dimensioned such that the forces of, for example, 1-2 kN which occur in the force engagement zone of the brake disk during a contacting operation during an air play setting operation and also the axially acting inertial forces of, for example, 2-4 kN which occur essentially in the center of gravity of the brake disk cause no axial movement, or only a negligibly small axial movement, of the brake disk and, during a braking operation, the forces, which counteract the required relative mobility of the brake disk, increase only slightly.

The axially acting inertial forces which occur in the center of gravity of the brake disk, act as vibrational loading and, for the purpose of compensation, bring about corresponding holding forces which are to be applied by means of the elastic pressure elements on the one hand, and the contact forces during contact, said contact forces being smaller by a factor of 2 and requiring correspondingly reduced holding forces of the elastic pressure elements, can be brought into line with one another in that only a small tilting movement of the brake disk is initially performed when the brake disks are adjusted by means of adjusting or actuating pistons of the brake as a result of the single-sided force engagement on the friction face of the brake disk. It is necessary to overcome only a partial force of the elastic pressure elements which are situated radially further inward.

Since the inertial forces essentially act in the center of gravity of the brake disk, the full contact force of the pressure elements counteracts the inertial forces.

By suitably selecting the position of the brake actuating piston and also the position of the pressure elements, which positions can both be selected within certain limits, the ratio between the actuating resistance and the holding forces in the event of the action of vibration can likewise be freely selected within certain limits.

In principle, the pressure element can consist of a pressure spring which rests, at the end side, on the brake disk and/or on the brake caliper. However, an embodiment of the pressure elements in which the contact region consists of a non-elastic contact piece, so that the spring itself is not in direct contact with the brake disk, is particularly advantageous. In this way, the contact temperatures which are high under some circumstances, and could otherwise lead to a reduction in the elastic spring force, are not transmitted to the spring itself. The contact piece and the spring which adjoins it can be formed as either a single component or as two interacting components.

It is also conceivable that the brake caliper is configured as a sliding caliper, such that it is moveable relative to a vehicle-mounted component such as an axle flange or the like, and such that the brake caliper rests, under elastic preload, on the stop on the vehicle-mounted component (brake caliper). When the disk brake is a sliding- or pivoting-caliper brake having a fixed brake disk and moveable brake caliper, an elastic "resetting and holding force" can also act in this way. The brake caliper in this case is held by means of the force in the stop position, counter to the forces which act when the air play is being set, and the force in turn is dimensioned such that when the brake is actuated, the movement of the brake caliper which is then required is subject to only a small resistance which does not impede the braking operation.

The spring force, which preferably results from a pressure spring, is to be dimensioned such that when the brake is actuated, the required relative movement between the brake disk and the brake caliper is made possible without an increased spring resistance.

On the other hand, the spring force should also be such that single-sided slip of the brake is avoided in the event of an undefined position of, for example, a sliding caliper as a result of inertial forces which occur during operation, for example during cornering. The spring force must be sufficient in order to be able to absorb the occurring inertial forces. This likewise applies for the brake disk, which functions as a sliding disk, of a fixed-caliper brake.

The contact force which is applied by the elastic pressure element should also be dimensioned such that the inertial forces and moments which occur during normal driving cannot permanently move the brake disk and/or the brake caliper out of the contact position.

The pressing forces of the one or more pressure elements should, on the other hand, be kept low enough that when the brake is applied, only the smallest resistance possible has to be overcome, since the resistance can otherwise lead to unequal braking forces on both sides of the brake disk and thus to unequal brake lining wear.

In a method for controlling a disk brake according to the invention, the position of the brake disk or of the brake caliper against the stop is used as a reference point in the control of the adjusting motors of the disk brake. This is extremely advantageous, since the zero point required for control operations of all types (air play setting, disk cleaning etc.) can in this way be repeatedly precisely determined in a simple manner. To avoid excessive instantaneous power consumption, the adjustment can also take place sequentially at the different brakes of a vehicle one after the other. The movements of the disk and/or linings during air play setting operations and functions of all types can also be realized in a virtually "force-free" fashion or without excessive counteracting frictional forces or the like, and can therefore be performed in a particularly precise and reliable manner, as a result of the stop.

Further advantageous embodiments of the invention are described in the following on the basis of the appended drawings.

Each of FIGS. 2a, 2b, 3a, and 3b shows details of one of several different exemplary embodiments, likewise in schematic side views, in each case together with an associated force-travel diagram.

DETAILED DESCRIPTION OF THE INVENTION

Figure 1:
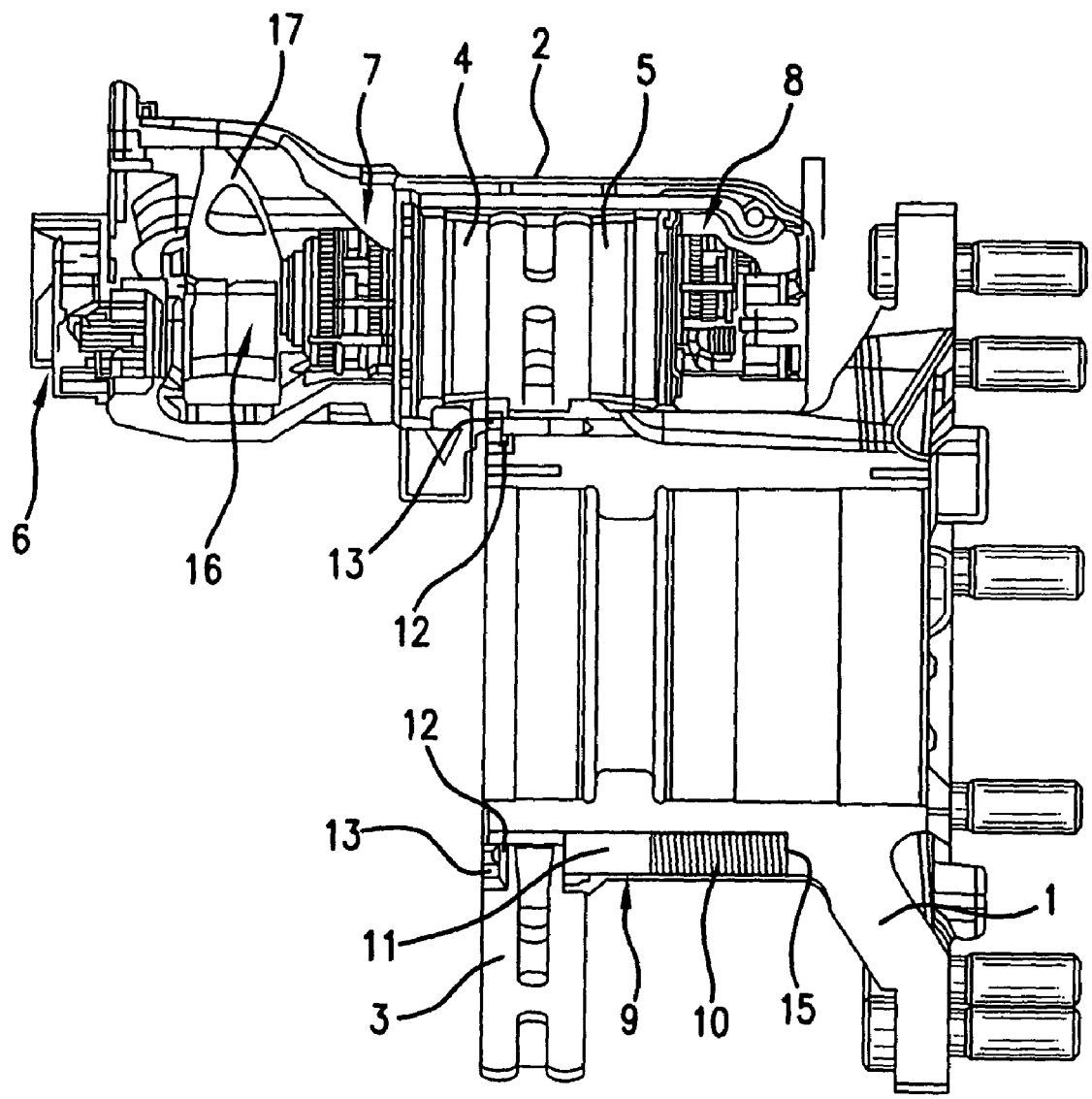
FIG. 1 shows a disk brake in a schematic side sectional view.
Figure 2A:
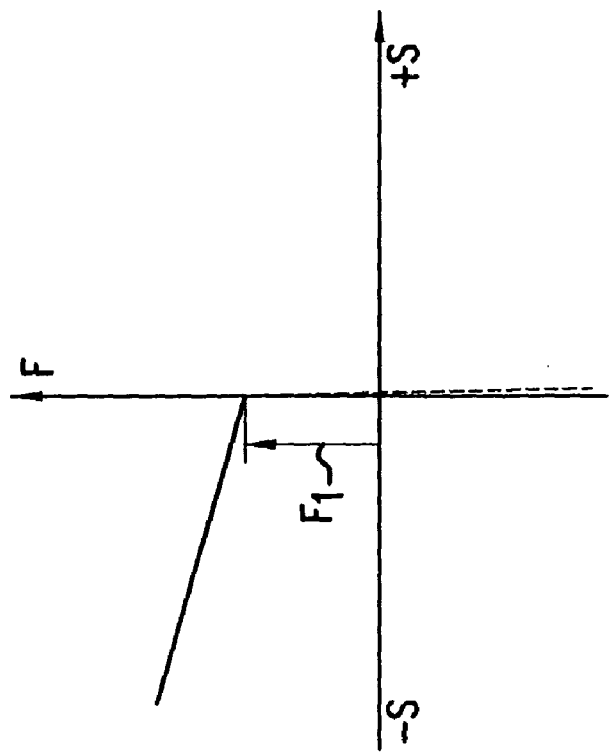
Figure 2B:
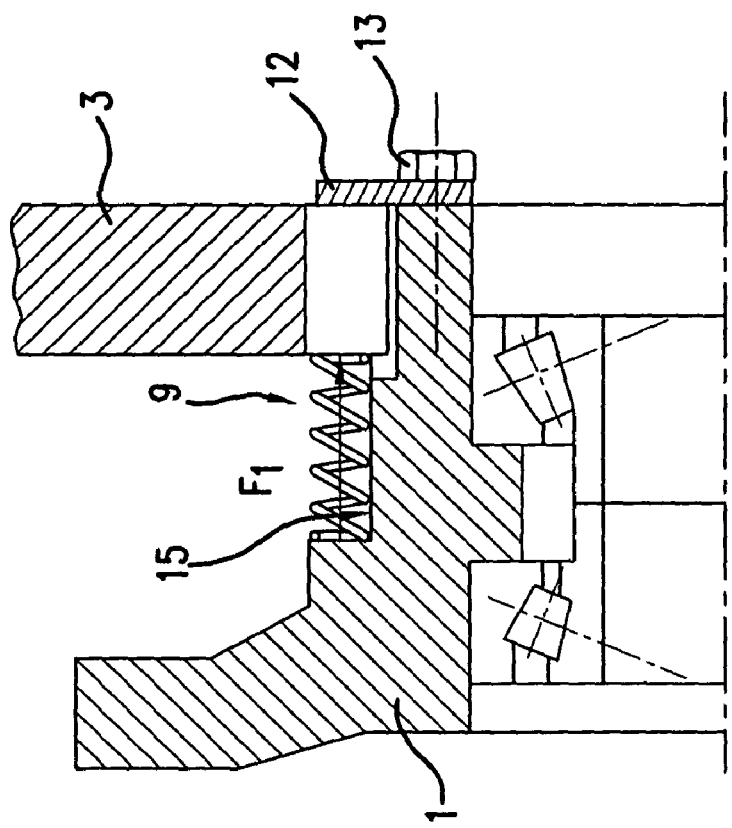

FIG. 1 illustrates a disk brake, which is embodied here by way of example as a fixed-caliper brake, for commercial vehicles, said disk brake having a brake caliper 2 which is embodied as a fixed caliper and engages over a brake disk 3 which is arranged in an axially displaceable and rotationally secured manner on a vehicle part which is embodied as an axle flange 1. The fixed caliper 2 is fixed to the axle flange 1 in a non-movable manner.

An application device 16, which can be actuated by a piston rod of a brake cylinder, is arranged in the fixed caliper 2, said application device 16 having a rotary lever 17 mounted eccentrically in the brake caliper and being designed and constructed in such a way that when the rotary lever 17 pivots, pressure pieces (not shown here in detail) are pushed onto said side of the brake disk 3 (referred to as the application side) parallel to the brake disk axis. The pressure pieces press a brake shoe 4, which is arranged on the application side, against the brake disk 3 which, during a continuing application movement, is displaced axially in the direction of the other one on the other side of the brake disk (reaction side) until it comes into contact there and the actual braking action between the brake disk 3 and the brake shoes 4, 5 takes effect. The brake disk 3 and, with it, the wheel hub and an attached wheel (not illustrated) are braked as a result of the frictional contact of the two brake shoes 4, 5. With regard to the function of an exemplary application device, reference is additionally made to international publication WO 02/14708.

Each of the brake shoes 4, 5 is assigned at least one, and in particular two, adjusting devices 7, 8 on the application side and at the reaction side. By means of the adjusting devices 7, 8, operation-related wear of the brake shoes 4, 5 can be compensated, that is to say, by way of example, after each or after a plurality of braking operation(s), the brake shoes 4, 5 are adjusted, by the distance of the wear thickness, in the direction of the brake disk 3. The adjusting devices are electromechanically driven, with one electric motor 6 being provided here on each side of the brake disk, of which electric motors 6 it is possible here to see the electric motor 6 on the application side. This electric motor 6 acts via a drive connection on rotary spindles or the like which, when rotated, change the axial position of the pressure pieces relative to the brake disk 3. The advantage of the adjusting operations lies, inter alia, in the possibility of utilizing "intelligent" air play functions which extend far beyond merely adjusting the brake.

In order to ensure that the brake disk 3 is pushed back into its initial position after the end of the braking operation, so that sufficient free play is produced between the outer brake shoe 5 and the brake disk 3, according to the invention, pressure elements 9 are provided which are elastic in the displacement direction of the brake disk 3, the brake disk 3 bearing against the pressure elements 9.

According to a variant which is not shown here, a plurality of pressure elements 9 are provided which are distributed uniformly in the circumferential direction and preferably bear against the region of the axially inner edge of the brake disk 3.

The displacement of the brake disk caused by the pressure elements 9 is delimited by stops 12 which can be particularly clearly seen in FIGS. 2 and 3.

The fixed stops 12 are held by screws 13 which are screwed into the axle flange 1 at the end side.

The pressure element 9 shown in FIG. 1 is, by way of example, formed in two parts in a compact arrangement. The pressure element 9 comprises a contact piece 11, which bears against the brake disk 3, and a pressure spring 10, which is formed as a coil spring, for generating the elastic preload between the stop 12 and the brake disk 3. Another type of embodiment is alternatively also conceivable, for example on the basis of plate springs which act, for example, via a sleeve. Spring steel, for example, is used as the material.

The two-part design actively prevents frictional heat which is produced during braking from being transmitted from the heated brake disk 3 to the pressure spring 10.

The pressure elements 9 are in each case inserted in an axially extending recess 15 of the axle flange 1.

Here, the stops 12 are situated on the application side, so that after a braking operation, the brake disk is reset from the reaction side in the direction of the application side.

FIGS. 2 and 3 each illustrate a partial section of the disk brake in the contact region of a pressure element 9 against the brake disk 3.

While, in FIG. 2, the stop 12 which delimits the return sliding path of the brake disk 3 is fixedly positioned, in the exemplary embodiment in FIG. 3, the stop 12 is arranged such that it is flexible in the displacement direction of the brake disk 3, for which purpose a pressure element 14 in the form of a coil spring (a plate spring or other spring, for example, is also conceivable here) is provided which rests on one side on the head of the screw 13 and on the other side on the stop 12.

Axial bearing of the brake disk is provided by correspondingly dimensioning the spring forces of the pressure elements 9, 14. The bearing permits a displacement of the brake disk beyond the stop position in the event of extreme cornering and the exceptional deformations of the axle components which occur in the process. For full functional capability, the spring force of the pressure element 14 must, of course, be greater than that of the pressure element 9, which forms a counterforce. In this way, each stop is pressed against the vehicle-mounted component by means of the further elastic pressure element 14. The force of the pressure element is greater than and counteracts that of the other pressure element 9 (see in each case FIGS. 2b and 3b).

In addition, the use of the two pressure elements 9, 14 provides that the brake disk 3 is also held in its position in the event of considerable operation-related vibrations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An electromechanically or pneumatically operated disk brake, comprising:
    a brake caliper,
    a brake disk engageable over by the brake caliper at least in sections at an outer brake disk circumference, the brake disk and the brake caliper being moveable relative to one another, with the brake disk axially displaceable and rotationally fixed on an axle-mounted component that slidably mounts the brake disk,
    an application device at least partially inserted into the brake caliper to provide an application movement between brake shoes and the brake disk,
    at least one adjusting device for setting air play between the brake shoes and the brake disk,
    first pressure elements disposed between the axle-mounted component and the brake disk to force the brake disk and the axle-mounted component axially apart under an elastic preload when the disk brake is not applied, a stop, against which the brake disk bears under said elastic preload provided by the first pressure elements when the disk brake is not applied, and at least one second pressure element providing a spring force biasing the stop against the axle-mounted component, wherein the stop is disposed on the axle-mounted component, wherein at least one of the pressure elements includes a contact piece, which bears against the brake disk, and a flexible spring force producing element interposed between the contact piece and the axle-mounted component, wherein the stop is flexibly arranged on the axle-mounted component in a displacement direction of the brake disk, and wherein an effective direction of said spring force biasing the stop against the axle-mounted component counteracts an effective direction of the flexible pressure element.

2. The disk brake as claimed in claim 1, wherein the force of the at least one second elastic pressure element counteracts that of the flexible spring force producing element.

3. The disk brake as claimed in claim 2, wherein the second pressure element is embodied as a coil spring or a plate spring.

4. An electromechanically or pneumatically operated disk brake, comprising:

a brake caliper, a brake disk engageable over by the brake caliper at least in sections at an outer brake disk circumference, the brake disk and the brake caliper being moveable relative to one another, with the brake disk axially displaceable and rotationally fixed on an axle-mounted component that slidably mounts the brake disk, an application device at least partially inserted into the brake caliper to provide an application movement between brake shoes and the brake disk, at least one adjusting device for setting air play between the brake shoes and the brake disk, pressure elements disposed between the axle-mounted component, within at least one recess delimited by a shoulder of the axle-mounted component, and a surface of the brake disk facing said shoulder to force the brake disk and the axle-mounted component axially apart under an elastic preload when the disk brake is not applied, and a stop, against which the brake disk bears under said elastic preload provided by the pressure elements when the disk brake is not applied, wherein the stop is disposed on the axle-mounted component, and wherein each pressure element includes a contact piece, which bears against the brake disk, and a pressure spring interposed between the contact piece and the axle-mounted component.

* * * * *